US008361573B2

(12) United States Patent
Koenig

(10) Patent No.: US 8,361,573 B2

(45) Date of Patent: Jan. 29, 2013

(54) WATERFAST DYE FIXATIVE COMPOSITIONS FOR INK JET RECORDING SHEETS

(75) Inventor: Michael F. Koenig, Loveland, OH (US)

(73) Assignee: International Paper Company, Memphis, TN (US)

( * ) Notice: Subject to any disclaimer, the term of this patent is extended or adjusted under 35 U.S.C. 154(b) by 0 days.

(21) Appl. No.: 12/826,169

(22) Filed: Jun. 29, 2010

(65) Prior Publication Data

US 2011/0097520 A1 Apr. 28, 2011

Related U.S. Application Data

(60) Division of application No. 12/228,885, filed on Aug. 15, 2008, now Pat. No. 7,745,525, which is a continuation of application No. 10/456,729, filed on Jun. 6, 2003, now abandoned.

(60) Provisional application No. 60/387,359, filed on Jun. 10, 2002.

(51) Int. Cl.
*C08K 3/10* (2006.01)
*B41M 5/50* (2006.01)

(52) U.S. Cl. ................. 428/32.3; 428/32.34; 525/54.31; 525/540; 106/401; 524/47; 524/437

(58) Field of Classification Search ................. 428/32.3, 428/32.38; 525/54.31, 540; 106/401; 524/47, 524/437
See application file for complete search history.

(56) References Cited

U.S. PATENT DOCUMENTS 3,658,641 A 4/1972 Shen
3,929,701 A 12/1975 Hall et al.
4,128,511 A 12/1978 Streit et al.
4,267,088 A 5/1981 Kempf
4,334,878 A 6/1982 Cutler et al.
4,359,513 A 11/1982 Katagiri et al.
4,371,582 A 2/1983 Sugiyama et al.
4,446,174 A 5/1984 Maekawa et al.
4,481,244 A 11/1984 Haruta et al.
4,547,405 A 10/1985 Bedell et al.
4,554,181 A * 11/1985 Cousin et al. ................ 428/32.3
4,877,680 A 10/1989 Sakaki et al.
4,892,787 A 1/1990 Kruse et al.
4,944,988 A 7/1990 Yasuda et al.
4,963,189 A 10/1990 Hindagolla
5,098,475 A 3/1992 Winnik et al.
5,198,022 A 3/1993 Aulick et al.
5,254,159 A 10/1993 Gundlach et al.
5,270,103 A 12/1993 Oliver et al.
5,320,902 A 6/1994 Malhotra et al.
5,354,803 A 10/1994 Dragner et al.
5,360,472 A 11/1994 Radigan, Jr. et al.
5,364,462 A 11/1994 Crystal et al.
5,425,805 A 6/1995 Botros et al.
5,498,283 A 3/1996 Botros et al.
5,575,924 A 11/1996 Bair et al.
5,652,293 A 7/1997 Eisenhart et al.
5,709,976 A 1/1998 Malhotra (Continued)

FOREIGN PATENT DOCUMENTS

EP 503933 A2 * 9/1992
EP 0661168 7/1995

*Primary Examiner* — Vu A Nguyen
(74) *Attorney, Agent, or Firm* — Thomas W Barnes, III; John K. Pike

(57) ABSTRACT

A coating composition comprising a blend of at least two dye fixatives, at least one of which is a cationic polymer, and at least one of the other dye fixatives is a polyvalent metal salt, to form a water-insoluble complex. The ink recording sheets comprise a composition that is absorbed into the surface of the substrate as a sizing material, or alternatively, forms a continuous layer on the substrate. The present invention also encompasses methods for making the ink jet recording sheets.

10 Claims, 2 Drawing Sheets

U.S. PATENT DOCUMENTS

| | | | |
|---|---|---|---|
| 5,714,270 | A | 2/1998 | Malhotra et al. |
| 5,739,179 | A | 4/1998 | Chiou et al. |
| 5,741,871 | A | 4/1998 | Bott et al. |
| 5,747,391 | A | 5/1998 | Neubach |
| 5,814,374 | A | 9/1998 | Nkansah et al. |
| 5,830,934 | A | 11/1998 | Krishnan |
| 5,876,492 | A | 3/1999 | Malhotra et al. |
| 5,897,961 | A | 4/1999 | Malhotra et al. |
| 5,902,390 | A | 5/1999 | Malhotra et al. |
| 5,904,738 | A | 5/1999 | Purcell |
| 5,910,211 | A | 6/1999 | Ueda et al. |
| 5,922,117 | A | 7/1999 | Malhotra et al. |
| 5,931,995 | A | 8/1999 | Malhotra et al. |
| 5,952,104 | A | 9/1999 | Sugiyama et al. |
| 5,958,999 | A | 9/1999 | Bates et al. |
| 6,001,899 | A | 12/1999 | Gundlach et al. |
| 6,013,708 | A | 1/2000 | Mallon et al. |
| 6,033,526 | A | 3/2000 | Ehrhardt et al. |
| 6,086,661 | A | 7/2000 | Malhotra et al. |
| 6,129,785 | A | 10/2000 | Schliesman et al. |
| 6,130,287 | A | 10/2000 | Krishnan |
| 6,171,444 | B1 | 1/2001 | Nigam |
| 6,232,395 | B1 | 5/2001 | Sun et al. |
| 6,241,787 | B1 | 6/2001 | Nigam |
| 6,310,124 | B1 | 10/2001 | Huang et al. |
| 6,886,687 | B2 | 5/2005 | Bolongia et al. |
| 7,235,284 | B1 | 6/2007 | Fryberg et al. |
| 2002/0045035 | A1 | 4/2002 | Nojima et al. |
| 2002/0089578 | A1 | 7/2002 | Yoshino et al. |
| 2002/0148577 | A1 | 10/2002 | Niu et al. |

* cited by examiner

WATERFAST DYE FIXATIVE COMPOSITIONS FOR INK JET RECORDING SHEETS

This application claims the benefit of U.S. Provisional Application Ser. No. 60/387,359 filed on Jun. 10, 2002, which is incorporated herein by reference.

FIELD OF INVENTION

The present invention relates to waterfast ink jet recording compositions and sheets. In particular it relates to coating compositions which are comprised of dye fixative blends which form water-insoluble complexes. These compositions are coated on at least one surface of a substrate to make an ink recording sheet. The coating composition is absorbed into the surface of the substrate as a sizing material, or alternatively, forms a continuous layer on the substrate.

BACKGROUND OF INVENTION

Ink jet coatings that are waterfast or waterproof are highly desirable in the ink jet printing industry. In general, there are two methods in the prior art for making an ink jet coating waterfast or waterproof. The first involves using a water-insoluble binder, such as a latex or a cross-linked polymer (e.g. cross-linked polyvinyl alcohol). By using a water-insoluble binder, the coating will maintain its strength when exposed to water. This concept applies both to coatings that are composed of only a binder (polymer) component and to coatings that are composed of binder plus pigment. This is the approach that is described in U.S. Pat. No. 4,877,680 to Sakaki et al. as well as U.S. Pat. No. 5,270,103 to Oliver et al.

However, since most dye fixatives and most dyes or inks are water-soluble, even if the binder is water-insoluble, the dye, which forms a printed image on the paper, will still have a tendency to run or bleed if it makes contact with water. Thus, water-insoluble binders should only be used if the dye fixative/dye complex is also water-insoluble.

The second method involves using a dye fixative of high molecular weight. When the paper is imaged, the dye from the ink jet ink can complex with the dye fixative, thereby decreasing the solubility of the dye and increasing its water resistance. This method can be used if the fixative is water-soluble or insoluble. However, for best water resistance, if the fixative is water-soluble, it should also have a sufficient number of absorptive sites so that the resulting dye fixative/dye complex is water-insoluble. This approach is described in Sugiyama et al in U.S. Pat. No. 4,371,582.

Because this method requires using a dye fixative of high molecular weight, and in some case, with a sufficient number of absorptive sites, the selection of available dye fixatives is significantly reduced. The high molecular weight will also make the ink jet coating more viscous, and hence more difficult to pump and coat during the manufacturing process.

A need therefore exists to provide a more cost effective and efficient way to make ink jet recording sheets with excellent waterfast properties.

The present invention is an improvement over the prior art methods for making waterfast ink jet recording sheets. In the present invention, it is now possible to use dye fixatives which were once regarded as too water-soluble to make suitable waterfast recording sheets. The present invention comprises compositions containing blends of dye fixatives. The blends form water-insoluble complexes. The dye or ink will adhere to the water-insoluble complex and will not wash off the surface of the substrate.

The compositions are absorbed into the surface of the substrate as a sizing material, or alternatively form a continuous layer on the substrate. The resulting waterfast ink jet recording sheets made using these compositions are therefore an important improvement over the prior art.

Moreover, dye fixatives of the prior art are commonly used individually. However, because ink jet printers use different inks, an individual dye fixative is generally not suitable for all types of inks. As stated above, the present invention uses compositions containing a blend of at least two dye fixatives. By using a blend of dye fixatives, a wider range of ink types can be made waterfast, and hence are available when printing images using ink jet printers.

Additionally, the compositions of the present invention are more easily mixed with starch as a binder or sizing agent, because the pH of the blend of dye fixatives is adjusted to be within the most favorable pH range for starch to remain stable, namely 6 to 8. Since starches are a common and inexpensive sizing and binding material for paper and paper coatings, improved compatibility with starches greatly enhances ease of use on the paper and coating machines used in the industry.

Accordingly it is the broad object of the present invention to provide a coating composition and an ink jet recording sheet having improved waterfast qualities.

Additionally, it is another object of the present invention to provide a coating composition for use in an ink jet recording sheet having unexpected enhanced print performance, i.e., an increase in print density and print resolution along with reduced wicking and color-to color bleed.

It is another object of the present invention to provide a coating composition and an ink jet recording sheet, which can be used with a wider variety of inks.

It is a further object of this invention to provide an ink jet recording sheet that is more cost effective and easier to manufacture than the prior art ink recording sheets.

It is yet another object of the present invention to provide a method for making an ink jet recording sheet to create these improved ink jet recording sheets and images.

SUMMARY OF THE INVENTION

The present invention is a coating composition comprising a blend of at least two dye fixatives that forms a water-insoluble complex. At least one of the dye fixatives in the blend is a cationic polymer and at least one of the other dye fixatives is a polyvalent metal salt.

The cationic polymer is selected from the group consisting of dicyandiamide-formaldehyde resin, polyethylenimine-epichlorohydrin, polydiallyldimethyl-ammonium chloride (p-DADMAC or p-DMDAAC), polyacrylamide, and cationic polymers which contain primary, secondary, tertiary or quaternary amine functionalities. The cationic polymers containing amine functionalities include cationic starches, cationic polyvinyl alcohols, cationic vinyl polymers, cationic styrene-containing polymers, cationic polyurethanes, quaternary amine salts, and the like. Preferably, the cationic polymer is dicyandiamide-formaldehyde resin.

The polyvalent metal salt is a water-soluble salt containing an element selected from the group consisting of aluminum, magnesium, zinc, manganese, copper, cobalt, tin, nickel, chromium, zirconium, and iron. Preferably, the polyvalent metal salt is a polyaluminum chloride, most preferably, aluminum chlorohydrate.

Most preferably, the blend is comprised of aluminum chlorohydrate and dicyandiamide-formaldehyde resin. The ratio of aluminum chlorohydrate to dicyandiamide-formaldehyde resin is in the range of 1:20 to 1:1, and preferably 1:2 by dry weight.

The present invention is also directed to an ink recording sheet comprising a substrate coated on at least one side with a composition comprising the dye fixative blend. The blend forms a water-insoluble complex. Preferably the substrate is selected from the group consisting of paper, textile and plastic film.

In one embodiment, the composition forms a continuous film on the substrate. Preferably, the continuous film is used as an ink receiving layer, which may be combined with other materials.

In a second embodiment, the composition containing the water-insoluble complex is absorbed into the surface of the substrate as a sizing material.

In the embodiment wherein the composition is an ink receiving layer, the ink receiving layer may further comprise a material selected from the group consisting of binders, pigments, defoamers, surfactants, thickeners, and a combination of at least two of the above.

In the embodiment wherein the composition is used as a sizing agent, a material selected from the group consisting of pore volume regulators, defoamers, surfactants, thickeners, and a combination of at least two of the above may be added to the compositions of the present invention prior to sizing and to assist in the sizing process.

The present invention also encompasses a method for making an ink jet recording sheet comprising, providing a composition comprising a blend of at least two dye fixatives; adjusting the pH of the blend to between 6 and 8 to form a water-insoluble complex; providing a substrate; and coating the composition on at least one side of the substrate. In one embodiment of this method the composition forms a continuous film on the substrate. In another embodiment of this method, the composition containing the water-insoluble complex is absorbed into the surface of the substrate as a sizing material. The composition is absorbed by the substrate and may also lie on the surface of the substrate but may not form a continuous film on the surface.

In yet another embodiment of the method of the present invention, a material selected from the group consisting of binder, pore volume regulator, defoamer, pigment, surfactant, thickener, and a combination of at least two of the above is added to the composition prior to the pH adjustment step. In a further embodiment a material selected from the group consisting of binder, pore volume regulator, pigment, defoamer, surfactant, thickener, and a combination of at least two of the above is added to the composition after the pH adjustment step and prior to the coating step.

Other objects, features and advantages of the present invention will be apparent when the detailed description of the preferred embodiment of the invention are considered with reference to the drawings which should be construed in an illustrative and not limiting sense as follows:

DETAILED DESCRIPTION OF THE INVENTION

Figure 1:
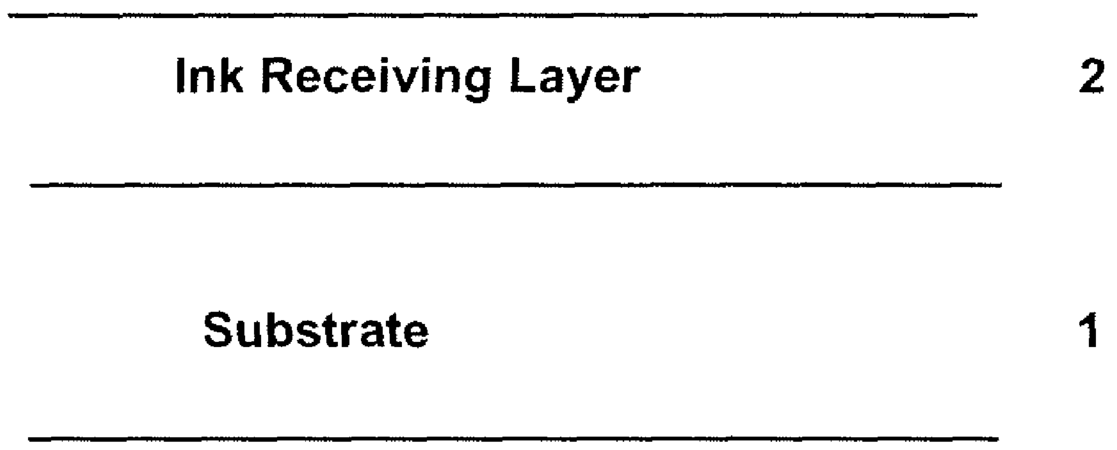
FIG. 1 is a schematic illustration of the ink jet recording sheet according to the first embodiment of the invention wherein the ink recording sheet comprises an ink receiving layer.

The present invention is a coating composition comprising a blend of at least two dye fixatives, wherein at least one of said dye fixatives is a water-soluble or water-dispersible cationic polymer and at least one of the other dye fixatives is a water-soluble or water-dispersible polyvalent metal salt. The blend of the cationic polymer and polyvalent metal salt forms a water-insoluble complex.

Suitable cationic polymers for use in the present invention include dicyandiamide-formaldehyde resin, polyethylenimine-epichlorohydrin, polydiallyldimethylammonium chloride (p-DADMAC or p-DMDAAC polymer), and cationic polymers which contain primary, secondary, tertiary or quaternary amine functionalities. The cationic polymers containing amine functionalities include cationic starches, cationic polyvinyl alcohols, cationic vinyl polymers, cationic styrene-containing polymers, cationic polyurethanes, quaternary amine salts, and the like.

Preferably, the cationic polymer is dicyandiamide-formaldehyde resin, the active ingredient in Fissatore L, CAS #26591-12-8 (Lamberti, SPA, Italy). Dicyandiamide is also known as dicyanodiamide, CAS#461-58-5, which in turn, is also known as dicyandiamin, cyanoguanidine, l-cyanoguanidine, and DICY.

Preferably, the quaternary amine salt is benzyl cocoalkyl dimethyl quaternary ammonium chloride, the active ingredient in Arquad DMCB, CAS#61789-71-7 (available in grades 50, 75, and 80 by Akzo Nobel, Chicago, Ill.). Polydiallyldimethylammonium chloride polymer is the active ingredient in Nalco CP-261, CAS#26062-79-3 (Ondeo Nalco, Naperville, Ill.). Polyethylenimine-epichlorohydrin is the active ingredient in Lupisol SC86X (BASF, Mount Olive, N.J.).

Suitable polyvalent metal salts for use in the present invention include water-soluble salts containing an element selected from the group consisting of aluminum, magnesium, zinc, manganese, copper, cobalt, tin, nickel, chromium, zirconium, and iron. Preferably, the polyvalent metal salt is a polyaluminum chloride (known as "PAC", CAS#1327-41-9), and most preferably, aluminum chlorohydrate. Aluminum chlorohydrate is the active ingredient in Sumachlor, CAS#12042-91-0 (Summit Research Labs, Flemington, N.J.).

The ratio of polyvalent metal salt to cationic polymer is preferably in the range of 1:20 to 1:1 by dry weight, most preferably 1:2 by dry weight. In the most preferred embodiment, aluminum chlorohydrate is blended with dicyandiamide-formaldehyde resin.

Polyvalent metal salts bind to cationic polymers through hydrogen bonding or coordination to electron-rich groups, found on such cationic polymers, such as groups containing oxygen, nitrogen and sulfur. At an acidic pH, the blend of polyvalent metal salt and cationic polymer of the present invention is water-soluble. When a strong base, such as concentrated sodium hydroxide, is added to acidic solutions of these polyvalent metal salts, the metal hydroxide is formed and precipitates from solution. Thus, when base is added to the composition to raise the pH, preferably, a pH of between 6 and 8, these polyvalent metal salts precipitate and the blend of polyvalent metal salt and cationic polymer will form a water-insoluble complex.

When the polyvalent metal salt used is aluminum chlorohydrate, the pH at which this transition from water-soluble to water-insoluble occurs is about 5.5. The base should be the type that will form the hydroxide of the polyvalent metal salt. Preferably the base is sodium hydroxide, potassium hydroxide, lithium hydroxide, calcium hydroxide, or ammonium hydroxide.

The present invention is also directed to an ink recording sheet comprising a substrate coated on at least one side with a composition comprising the dye fixative blend. The blend is manipulated to form a water-insoluble complex.

In one embodiment, the recording sheet forms a continuous film on the substrate. Preferably, the continuous film is used as an ink receiving layer.

In a second embodiment, the composition containing the water-insoluble complex is absorbed into the surface of the substrate as a sizing material. The composition is absorbed by the substrate and may also lie on the surface of the substrate, but does not form a continuous film.

In yet another embodiment, the substrate that is sized with the composition of the present invention can then be coated with an ink receiving layer containing the compositions of the present invention.

The substrate is selected from the group consisting of paper, textile and plastic film. Paper substrates include, but are not limited to cellulose based paper, cotton based paper, and RC coated or laminated paper that has a layer of plastic. When the substrate is plastic film, RC coated or laminated paper, it is preferably used in the embodiment wherein the recording sheet comprises an ink receiving layer.

As illustrated in FIG. 1, the compositions containing water-insoluble complexes form an ink receiving layer 2 on the substrate surface 1. In this embodiment, the layer is a continuous film. This embodiment is used to make what is known in the industry as coated paper, e.g. matte and glossy type paper.

Figure 2:
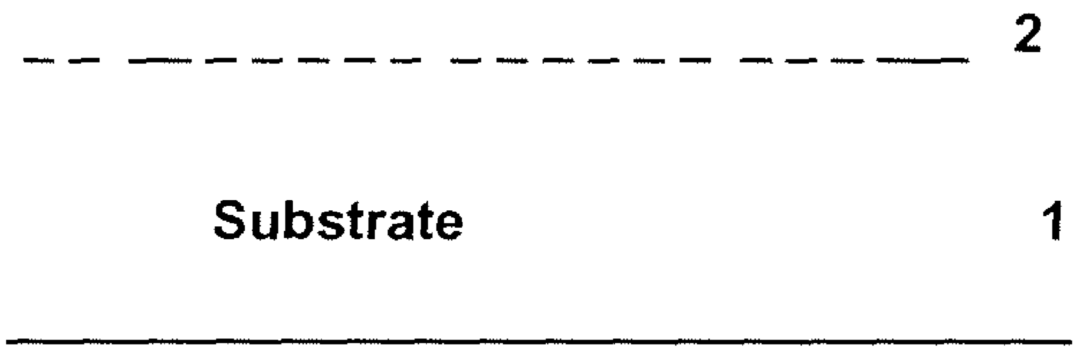
FIG. 2 is a schematic illustration of the ink jet recording sheet according to the second embodiment of the invention wherein the composition is used as a sizing material.

Alternatively, in the second embodiment shown in FIG. 2, the compositions containing water-insoluble complexes are absorbed into the surface 2 of the substrate 1, onto and between the interstices of the fibers of the substrate as a sizing material. In this embodiment, although the paper is being coated with the composition, the conventional terminology of this type of paper to one skilled in the art would be "uncoated."

More specifically, in the terminology typically used in papermaking, a paper is considered to be uncoated when the paper is produced on a paper machine, and the sizing material is applied with a size press. Another difference between to a sizing and a coating is the amount of material which is added to the surface on a dry weight basis. When a paper is sized, the amount of material added to the paper is in the range of 0.1 $g/m^2$ to about 2 $g/m^2$ on a dry weight basis. This material tends to be absorbed into the paper, and does not generally form a continuous film on the paper surface. The amount that is absorbed vs. the amount that lies on the surface of the substrate depends on the size press machine, as well as the coat weight and viscosity of the coating. For example, a coating with a high viscosity will tend to be less absorbed and remain more on the surface of the paper because it will dry before it can soak into the surface of the paper.

When a paper is coated, as in the case of matte or glossy type paper, the general methods of applying the coating will typically form a continuous film on the surface of the paper, and the amount of material added to the paper is in the range of 2 $g/m^2$ to 30 $g/m^2$ on a dry weight basis.

It is within the scope of the invention to coat both sides of the substrate. This is preferred if the paper or coating machine cannot easily be configured for one-sided application of material, or if the intended usage requires two-sided coating.

In the embodiment where the composition forms a continuous film on the substrate surface, the resulting ink receiving layer may further comprise a material selected from the group consisting of binder, pigment, defoamer, surfactant, thickeners, and a combination of at least two of the above. When the compositions containing the dye fixative blend is combined with these other materials to make an ink receiving layer, the composition generally constitutes 5% to 30% of the ink receiving layer by dry weight, and preferably 5% to 20%, and most preferably 10% to 15%.

The additional materials which may be added to make the ink receiving layer of the recording sheets of the present invention are well known to those skilled in the art, and generally include, but are not limited to polymeric binders alone, or in combination with inorganic pigments. Suitable binders are cold water-insoluble binders such as starch, derivatives of starch (also known as modified starch) such as ethylated starch or cationic starch, cross-linked polyvinyl alcohol, cross-linked derivatives of polyvinyl alcohol or modified polyvinyl alcohol, such as acid modified, cationic modified or graft co-polymers of polyvinyl alcohol, modified cellulosics such as carboxymethyl cellulose, hydroxyethyl cellulose, and hydroxymethyl cellulose, proteins such as casein, soy, and gelatin, vinyl polymers, styrene-containing polymers, and polyurethanes. Non cross-linked polyvinyl alcohol may also be used, however, an additional water-insoluble binder such as a latex should be added to the polyvinyl alcohol as a additional binder for the pigment. Preferably, the binder is cross-linked polyvinyl alcohol and styrene-containing polymers.

If the binder is used in a formulation without pigments, which is typical of a glossy ink jet coating, then the amount of binder in the ink formulation is between 80% and 100% by dry weight, depending on the amount of other additives such as thickeners and defoamers. If the binder is used in a formulation with pigments, then the amount of binder in the ink receiving layer is between 5% and 50% by dry weight, preferably 10% to 15% for pigments with low porosity or low surface area and 20% to 30% for pigments with high porosity or high surface area.

Suitable pigments include but are not limited to silica, alumina, clay and calcium carbonate, preferably, silica. The amount of pigment in the ink receiving layer is in the range of 30% to 90% by dry weight, and preferably 50% to 75%.

Additionally, defoamers, surfactants, thickeners, dispersants and wetting agents or a combination of the above may be added to the compositions prior to coating. The additives are generally in the range of 0% to 30% of the ink receiving layer by dry weight, and preferably 5% to 20%.

In the embodiment where the compositions are used as a sizing material, pore volume regulator, defoamer, thickener, surfactant and a combination of at least two of the above may be added to the compositions of the present invention prior to sizing the substrate to assist in the sizing process. In this embodiment, the pore volume regulator includes starch, polyvinyl alcohol, vinyl polymers, or styrene-containing polymers. These materials are therefore not added as a binder, but rather as a pore volume regulator i.e., it is added to regulate the pore volume and thus, how fast the ink absorbs into the recording sheet. Starch, polyvinyl alcohol, vinyl polymers and styrene-containing polymers will slow down the absorption of the ink on the substrate. In turn, slowing down the ink absorption provides an even more improved print quality. Thus, in this embodiment, there is no need for an additional binder. The amount of pore volume regulator added to the formulation depends on the surface energy of the material. For materials such as starch and polyvinyl alcohol which have high surface energies, the amounts of material in the formulation can vary from 0 to 90% by dry weight, more preferably between 5% and 70% by dry weight, and most preferably between 20% and 50% by dry weight. For materials such as vinyl polymers and styrene-containing polymers, which generally have low surface energies, the amounts of material in the formulation can vary from 0 to 20% by dry weight, more preferably between 0 and 10% by dry weight, and most preferably between 0 and 5% by dry weight. Other ingredients such as defoamers, thickeners, and the like can vary from 0 to 30% by dry weight, more preferably between 5 and 20% by dry weight, and most preferably between 5 and 10% by dry weight.

The base should be added after some or all of the additional sizing materials or coating materials that make up the ink receiving layer are added to the composition containing the blend of dye fixatives. However, some coating materials are sensitive to acidic pH levels. If this is of concern, then the base can be added to the composition before the additional materials are added. This is especially important when starch is used as a binder (or as a sizing material). Starch degrades in the presence of acid and since most dye fixatives are commercially available at acidic pHs, the starch will degrade before it is effectively combined with the dye fixative blend composition to form the ink receiving layer.

It is also important to note that, when the composition is used as a sizing material, the percentage of solids in the coating applied to the paper is generally low, e.g. 3% to 10%, because the composition is diluted with water. In this instance the water-insoluble complex will be in the form of a colloidal suspension and will precipitate out after it is applied to the substrate and the water evaporates. When the composition is used as part of an ink receiving layer, the percentage of solids in the coating that becomes the ink receiving layer is more concentrated e.g. 30% to 50%, and the complex will precipitate before it is applied, requiring the composition and any additional materials added to the composition to make the ink receiving layer to be vigorously stirred.

The present invention also encompasses a method for making an ink jet recording sheet comprising the steps of providing a composition comprising a blend of at least two dye fixatives; adjusting the pH of said blend to between 6 and 8 to form a water-insoluble complex; providing a substrate; coating said composition on at least one side of said substrate; and allowing said coating to dry. The composition is absorbed into the surface of the substrate as a sizing material, or alternatively, forms a continuous film on the substrate surface. In both of these embodiments, the coating should be allowed to dry before printing images.

In one embodiment, at least one material selected from the group consisting of binder, pore volume regulator, pigment, defoamer, surfactant, thickener, and a combination of at least two of the above is added to the composition prior to adjusting the pH. Alternatively, at least one material selected from the group consisting of binder, pore volume regulator, pigment, defoamer, surfactant, thickener, and a combination of at least two of the above is added to the composition after the adjustment of the pH.

The present invention will be illustrated in more detail by the following examples without limiting the scope of the claimed compositions or method in any way.

EXAMPLES

Example I

The print density and waterfastness of an ink jet recording sheet according to the present invention was tested. The specific formulation tested is set forth below in Table I. This example is of a size press formulation containing a blend of two dye fixatives and starch.

TABLE I

Formulation of Dye Fixative Composition Used in Size Press

| Ingredient | Quantity (g) | Concentration (%) | Dry Weight Ratio (%) |
|---|---|---|---|
| Starch | 25.2 | 10 | 25 |
| Fissatore L | 11.3 | 44 | 50 |
| Sumachlor | 5.0 | 50 | 25 |
| Water | 58.5 | 0 | 0 |
| Totals | 100 | 10 | 100 |

Fissatore L is dicyandiamide-formaldehyde resin, CAS #26591-12-8 (Lamberti, SPA, Italy).

Sumachlor is aluminum chlorohydrate, CAS # 12359-72-7 (Summit Research Labs, Flemington, NJ).

The starch used in this example was a Penford hydroxyethyl starch, designated PG-290, CAS#9005-27-0 (Penford Products, Cedar Rapids, Iowa). This starch was cooked in a starch cooker following the heating schedule recommended by the manufacturer at a concentration of 10% solids. The two dye fixatives, Fissatore L and Sumachlor, were received from the manufacturers as solutions in water, with concentrations shown in Table I. These dye fixatives were added to tap water in the quantities shown in Table I. The percent solids of the solution was 10% in total solids, and the viscosity was less than 20 cps. The solids content of the solution was measured in a commercially available microwave solids oven, manufactured by CEM, model LabWave 9000. The solution viscosity was measured with a Brookfield viscometer, model DV-II, using a #2 spindle at 100 rpm. Concentrated sodium hydroxide solution was then added to the blend of dye fixatives while stirring to raise the pH to 7. The dye fixative blend was then poured into the starch solution in the quantities shown in Table 1 to make 100 g of the sizing formulation.

The sizing formulation was applied to a paper with no existing surface sizing. This paper was taped to a supporting paper, and the solution applied to the paper using a #10 wire wound rod to meter off the solution. The paper was then dried in a forced air oven at 120 degrees C. for two minutes. The paper was weighed before and after sizing, and the amount of sizing added was about 1 g/m$^2$. The amounts of each ingredient in the dried sizing can be calculated from the values listed in Table I in the column entitled Dry Weight Ratio.

The paper was then loaded into a Hewlett Packard DeskJet 722C ink jet printer, and solid blocks of several colors were printed onto the paper, using the plain paper setting of the printer. These colors included cyan, magenta, yellow, and black. The print density of each colored block was measured using an X-Rite model 404 spectrophotometer. The waterfastness was determined by comparing the print density before and after soaking the printed paper in tap water for 1 minute. The change in print density for each colored block was calculated by the following equation:

$$\%\ \text{Change} = \frac{(\text{Density After} - \text{Density Before}) \times 100}{\text{Density Before}}$$

For this calculation, if the density after soaking is less than the density before soaking, then the % change will be a negative value. Therefore, poor dye fixatives will have large negative % change for one or more of the colored blocks measured. The print density and waterfastness test results are in Table IV.

Example II

TABLE II

Formulation of Dye Fixative Composition Used in Size Press

| Ingredient | Quantity (g) | Concentration (%) | Dry Weight Ratio (%) |
|---|---|---|---|
| Starch | 20.2 | 10 | 20 |
| Arquad DMCB-80 | 6.3 | 80 | 50 |
| Sumachlor | 6.0 | 50 | 30 |
| Water | 67.5 | 0 | 0 |
| Totals | 100 | 10 | 100 |

Sumachlor is aluminum chlorohydrate, CAS # 2359-72-7 (Summit Research Labs, Flemington, NJ).
Arquad DMCB-80 is benzyl cocoalkyl dimethyl quaternary ammonium chloride, CAS# 61789-71-7 (Akzo Nobel Chicago, IL).

The two dye fixatives, Arquad DMCB-80 and Sumachlor, were received from the manufacturers as solutions in water, with concentrations shown in Table I. These dye fixatives were added to tap water in the quantities shown in Table I. The percent solids of the solution was 10% in total solids, and the viscosity was less than 20 cps. Concentrated sodium hydroxide solution was then added to this solution while stirring to raise the pH to 7. This dye fixative mixture was then added to an equal quantity of cooked starch solution, also at 10% solids.

Sizing of paper with no existing surface sizing was performed in the lab using the same conditions as described above in Example I. The paper was then printed and tested using the same conditions as described above in Example I. The print density and waterfastness test results are in Table IV.

Example III

TABLE III

Formulation of Dye Fixative Composition Used in Size Press

| Ingredient | Quantity (g) | Concentration (%) | Dry Weight Ratio (%) |
|---|---|---|---|
| Starch | 20.8 | 10 | 21 |
| Nalco CP261 | 9.4 | 40 | 37 |
| Sumachlor | 8.3 | 50 | 42 |
| Water | 61.5 | 0 | 0 |
| Totals | 100 | 10 | 100 |

The two dye fixatives, Nalco CP261 and Sumachlor, were received from the manufacturers as solutions in water, with concentrations shown in Table I. These dye fixatives were added to tap water in the quantities shown in Table I. The percent solids of the solution was 10% in total solids, and the viscosity was less than 20 cps. Concentrated sodium hydroxide solution was then added to this solution while stirring to raise the pH to 7. This dye fixative mixture was then added to an equal quantity of cooked starch solution, also at 10% solids.

Sizing of paper with no existing surface sizing was performed in the lab using the same conditions as described above in Example I. The paper was then printed and tested using the same conditions as described above in Example I. The print density and waterfastness test results can be seen in Table IV. For this example, all of the inks used in this printer were made waterfast except the magenta ink. This choice of dye fixatives might not be appropriate for this printer if waterfastness is the main property of interest. If print density is more important for a particular application, then this dye fixative combination does give a very high print density and may be appropriate.

TABLE IV

Print Density and Waterfastness Test Results

| Sample ID | | Print Density C | M | Y | K |
|---|---|---|---|---|---|
| Example I | Before soaking | 0.91 | 1.14 | 1.01 | 1.51 |
| | After soaking | 0.84 | 1.13 | .098 | 1.57 |
| | % Change | −7.7 | −0.9 | −3.0 | −2.5 |
| Example II | Before soaking | 1.02 | 1.25 | 1.10 | 1.43 |
| | After soaking | 0.95 | 1.22 | 1.04 | 1.40 |
| | % Change | −6.9 | −2.4 | −5.5 | −2.1 |
| Example III | Before soaking | 1.09 | 1.50 | 1.28 | 1.59 |
| | After soaking | 1.00 | 1.12 | 1.21 | 1.41 |
| | % Change | −8.3 | −25.3 | −5.5 | −11.3 |

C = cyan,
M = Magenta,
Y = yellow,
K = black

TABLE V

Example IV
Formulation of Dye Fixative Composition Used in Matte Ink Receiving Layer

| Ingredient | Quantity (g) | Concentration (%) | Dry Weight Ratio (%) |
|---|---|---|---|
| Sylojet 405 | 10.5 | 100 | 59.1 |
| Disperbyk 190 | 1.0 | 40 | 2.4 |
| Fissatore L | 2.3 | 44 | 5.7 |
| Sumachlor | 1.2 | 50 | 3.3 |
| Water | 47.8 | 0 | 0 |
| Sodium Hydroxide | 1 | 50 | 0 |
| Celvol 523 | 26.1 | 10 | 14.8 |
| CDP 3117-9 | 10.1 | 26 | 14.8 |
| Totals | 100 | 17.8 | 100 |

Sylojet 405 is a silica gel, CAS# 63231-67-4 (W.R. Grace, Columbia, MD)
Disperbyk 190 is a dispersant, (Byk-Chemie, Wallingford, CT)
Fissatore L is dicyandiamide-formaldehyde resin, CAS #26591-12-8 (Lamberti, SPA, Italy).
Sumachlor is aluminum chlorohydrate, CAS # 12042-91-0 (Summit Research Labs, Flemington, NJ).
Celvol 523 is a poly(vinyl alcohol), CAS# 25213-24-5 (Celanese Chemicals, Dallas, TX)
CDP 3117-9 is a styrene-containing polymer, (OMNOVA, Fairlawn, OH)

The ingredients in Table V were mixed using the following procedure. Water was added to a vessel of suitable size, followed by the Disperbyk 190, Sumachlor, and Fissatore L with stirring. The silica was then added, and the mixture stirred under high sheer for about 20 minutes. The Celvol and CDP polymer were then added, and the mixture stirred at low speed for 10 minutes. Sodium hydroxide was then added to the final mixture to bring the pH in the 6-8 range.

The coating mixture was applied to a paper with no existing surface sizing. This paper was taped to a supporting paper, and the solution applied to the paper using a #26 wire wound rod to meter off the solution. The paper was then dried in a forced air oven at 120 degrees C. for two minutes. The paper was weighed before and after coating, and the amount of coating added was about 10 $g/m^2$. The amounts of each ingredient in the dried coating can be calculated from the values listed in Table V in the column entitled Dry Weight Ratio.

Finally, variations from the examples given herein are possible in view of the above-disclosure. Therefore, although the invention has been described with reference to certain preferred embodiments, it will be appreciated that other compositions may be devised, which are nevertheless within the scope and spirit of the invention as defined in the claims appended hereto.

The foregoing description of various and preferred embodiments of the present invention has been provided for purposes of illustration only, and it is understood that numerous modifications, variations and alterations may be made thereto without departing from the spirit or scope of the invention as set forth in the following claims.

The invention claimed is:

1. An ink jet recording sheet comprising:

a substrate coated on at least one surface with a composition comprising a blend of at least two dye fixatives; wherein said blend forms a water-insoluble complex;

wherein at least one of said dye fixatives is a dicyandiamide-formaldehyde resin and the other of said dye fixatives is a aluminum chlorohydrate;

and wherein said composition:

(a) forms a continuous film on said substrate surface, said continuous film being an ink receiving layer which further comprises a material selected from the group consisting of binders, pigments, defoamers, surfactants, thickeners, and a combination of at least two of the materials;

(b) is absorbed into the surface of said substrate as a sizing material;

or is both (a) and (b).

2. The ink recording sheet according to claim 1, wherein said substrate is selected from the group consisting of paper, textile and plastic film.

3. The recording sheet according to claim 1, wherein said composition is absorbed into the surface of said substrate as a sizing material and further comprises a material selected from the group consisting of pore volume regulators, defoamers, surfactants, thickeners, and a combination of at least two of the materials.

4. The recording sheet according to claim 1, wherein said binders are selected from the group consisting of starch, derivatives of starch, cross-linked polyvinyl alcohol, cross-linked derivatives of polyvinyl alcohol, modified polyvinyl alcohol, modified cellulosics, proteins, vinyl polymers, styrene-containing polymers, and polyurethanes.

5. The recording sheet according to claim 1, wherein said pigment is selected from the group consisting of silica, alumina, clay, and calcium carbonate.

6. The recording sheet according to claim 1, wherein the weight ratio of aluminum chlorohydrate to dicyandiamide-formaldehyde resin is in the range of 1:20 to 1:1.

7. The recording sheet according to claim 6, wherein the weight ratio of aluminum chlorohydrate to dicyandiamide-formaldehyde resin is 1:2.

8. The recording, sheet according to claim 1, wherein said composition (a) forms a continuous film on said substrate surface.

9. The recording sheet according to claim 1, wherein said composition (b) is absorbed into the surface of said substrate as a sizing material.

10. The recording sheet according to claim 1, wherein said composition is both (a) and (b).

* * * * *